US012654732B2

(12) United States Patent
  Brok

(10) Patent No.: US 12,654,732 B2
(45) Date of Patent: Jun. 16, 2026

(54) VEHICLE CONTROL SYSTEM

(71) Applicant: AUDI AG, Ingolstadt (DE)

(72) Inventor: Tobias Brok, Kösching (DE)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 19/044,852

(22) Filed: Feb. 4, 2025

(65) Prior Publication Data

US 2025/0304091 A1     Oct. 2, 2025

(30) Foreign Application Priority Data

Mar. 26, 2024    (DE) .......................... 102024108627.0

(51) Int. Cl.
  *B60W 50/14*      (2020.01)
  *B60W 30/14*      (2006.01)
  *B60W 30/182*     (2020.01)
  *B60W 50/08*      (2020.01)

(52) U.S. Cl.
  CPC .......... *B60W 50/14* (2013.01); *B60W 30/143* (2013.01); *B60W 30/182* (2013.01); *B60W 50/082* (2013.01); *B60W 2050/146* (2013.01); *B60W 2420/503* (2013.01); *B60W 2520/10* (2013.01); *B60W 2530/20* (2013.01); *B60W 2552/05* (2020.02); *B60W 2556/40* (2020.02); *B60W 2556/50* (2020.02)

(58) Field of Classification Search
  CPC ................................................... B60W 50/14
  See application file for complete search history.

(56) References Cited

U.S. PATENT DOCUMENTS

| | | | | |
|---|---|---|---|---|
| 2017/0361707 | A1* | 12/2017 | Flogård | B60K 23/0808 |
| 2018/0188031 | A1* | 7/2018 | Samper | B60W 60/0011 |
| 2022/0001879 | A1* | 1/2022 | Verheijen | B60W 40/09 |
| 2024/0383457 | A1* | 11/2024 | Xia | B60T 8/17551 |
| 2025/0050864 | A1* | 2/2025 | Weston | B60W 40/064 |

FOREIGN PATENT DOCUMENTS

| | | |
|---|---|---|
| DE | 10340053 A1 | 3/2005 |
| DE | 102011118436 A1 | 5/2013 |
| DE | 102012002690 A1 | 8/2013 |
| GB | 2523095 A | 8/2015 |
| WO | 2015121260 A1 | 8/2015 |

OTHER PUBLICATIONS

Office Action issued on Dec. 20, 2024 in corresponding German Application No. 102024108627.0, 6 pages.

* cited by examiner

*Primary Examiner* — Davetta W Goins
*Assistant Examiner* — Pameshanand Mahase
(74) *Attorney, Agent, or Firm* — Maier & Maier, PLLC

(57)     ABSTRACT

A vehicle control system with which different vehicle functions, such as a driving dynamics function and/or a component protection function, can be controlled, in which vehicle control system, in the case of onroad driving, an rpm-based vehicle speed determined by a wheel speed sensor forms a reference variable, on the basis of which the vehicle control system determines driving parameters and/or controls the vehicle function. The vehicle control system is assigned an evaluation unit which, in the presence of both offroad driving operation and a tire change signal, determines a GPS-based vehicle speed as a reference variable, on the basis of which the vehicle control system determines the driving operation parameters, such as an offroad tire diameter, and/or controls the vehicle functions.

13 Claims, 3 Drawing Sheets

VEHICLE CONTROL SYSTEM

FIELD

The invention relates to a vehicle control system for a motor vehicle.

BACKGROUND

In onroad driving, the vehicle speed of a motor vehicle is determined based on the current wheel speed detected by a wheel speed sensor and based on the tire diameter of the standard tires installed in the motor vehicle. Determining the vehicle speed solely on the basis of external signals, i.e. GPS signals, is not possible or permitted in onroad driving on public roads due to their not always guaranteed availability. In the prior art, the rpm-based vehicle speed determined in this way forms a reference variable on the basis of which the vehicle control system calculates driving parameters and/or controls vehicle functions, such as driving dynamics functions and/or component protection functions.

When using the rpm-based vehicle speed or a variable correlated therewith as a reference variable, the following problem arises: When using the vehicle on extreme offroad routes (for example in desert-rich countries), the vehicle user often changes from standard or series tires to offroad tires, which may have a large difference in tire diameter compared to the series tires. With such a large difference in tire diameter, the rpm-based vehicle speed determined based on the tire diameter of the standard tires and the current wheel speed deviates from the actual vehicle speed. This difference in speed can cause a malfunction of vehicle functions that depend on the actual vehicle and/or wheel speed (such as engine control, transmission control, ABS, ESC, ASR Hill-DescendControl, . . . ) or functions that require the actual wheel torque (e.g. drive/output shaft protection functions).

From DE 10 2012 002 690 A1 a method for controlling both the ABS system and the ASR system is known. The ABS and ASR systems are controlled depending on the speed of the vehicle, which is determined on the basis of the Global Positioning System (GPS system) and the values of which are fed into the control system.

From GB 2 523 095 A a device for determining the ground speed of a vehicle is known, which comprises a plurality of detection systems, each of which is configured to provide a respective data source indicative of the vehicle speed. A control is configured to receive each of the data sources from the plurality of detection systems. The control may mediate between the received plurality of data sources from the plurality of detection systems. In addition, a speed parameter can be determined from one of the data sources.

SUMMARY

The object of the invention is to provide a vehicle control system in which the vehicle functions can be carried out perfectly not only in onroad operation, but also in offroad operation of the vehicle.

The invention relates to a vehicle control system with which different vehicle functions, such as driving dynamics functions and/or a drive/output shaft protection function, can be controlled. In the vehicle control system, the rpm-based vehicle speed determined by means of a wheel speed sensor or a parameter correlating therewith forms a reference variable, provided that normal driving or onroad driving is present. Based on the rpm-based vehicle speed acting as a reference variable, the vehicle control system determines driving parameters and/or controls vehicle functions. According to the characterizing part of claim 1, the vehicle control system is assigned an evaluation unit which, in the presence of both offroad driving and a tire change signal, sets a GPS-based vehicle speed as a reference variable, instead of the rpm-based vehicle speed. In offroad driving mode, the vehicle control system determines driving parameters, such as an offroad tire diameter, based on the GPS-based vehicle speed and/or controls the vehicle functions based on the GPS-based vehicle speed. The tire change signal is generated if there is a significant deviation between an offroad tire and the standard tires.

This ensures that the vehicle always uses the actual vehicle speed determined via GPS, even on extreme offroad routes, which allows the vehicle control system to control the vehicle functions perfectly and thus avoid critical driving situations.

For example, if both offroad driving and the tire change signal are present, the vehicle control system can determine the offroad tire diameter using the following formula:

$$d_{offroad} = \frac{V_{GPS} \cdot 1000}{\pi \cdot n}$$

In a technical implementation, the evaluation unit can have a determination module; this can generate the tire change signal if there is a significant deviation between the rpm-based vehicle speed and the GPS-based vehicle speed. With regard to a process-reliable generation of the tire change signal, it is advantageous if a timer is assigned to the determination module, by means of which the determination module only generates the tire change signal when the speed difference is present over a predefined time interval.

The vehicle control system can determine the presence of offroad driving in different ways: For example, the vehicle control system can have a DriveSelect mode with an offroad button that can be operated by the user. When activated, the vehicle control system can switch the vehicle functions to offroad driving mode. For example, the evaluation unit can have a detection module that detects offroad driving when the offroad button is pressed and generates a corresponding offroad signal. If the offroad button is not pressed, the detection module generates an onroad signal.

Alternatively and/or additionally, offroad driving can also be determined as follows: In the determination module, a current GPS vehicle position can be compared with a road map data set stored in the vehicle control system. On the basis of this comparison, the determination module generates an offroad signal or an onroad signal, or detects offroad driving or onroad driving.

In a further development of the invention, the evaluation unit can also have a provision module which makes the following case distinctions: If both the offroad signal and the tire change signal are present, the provision module sets the GPS-based vehicle speed as the reference variable.

Alternatively, if both the onroad signal and the tire change signal are present, the provision module sets the rpm-based vehicle speed as the reference variable. When combining the onroad signal and the tire change signal, the evaluation unit can also generate a warning that the vehicle tires do not meet the approved specifications.

Furthermore, if the tire change signal is present, the evaluation unit can inform the vehicle user of a liability exclusion and/or a warranty limitation via the MMI interface. If necessary, the vehicle can only be used further if the vehicle user acknowledges the exclusion of liability and/or the warranty limitation.

However, if only the offroad signal is present (namely without a tire change signal), the vehicle control system can maintain the rpm-based vehicle speed as the reference variable. The same applies if only the onroad signal is present.

The vehicle control system according to the invention provides the following advantages: Functions or warning thresholds that could cause critical driving behavior can be deactivated or restricted (i.e. downgraded) if the evaluation unit detects the presence of both offroad driving and the tire change signal. In addition, according to the invention, component protection functions can calculate with the actual wheel diameter during offroad driving. In addition, component damage counters can calculate based on the torques and forces adjusted to the actual wheel diameters (in offroad driving). The vehicle manufacturer can also document onboard, for example in a cloud, whether and how intensively the vehicle was used in offroad driving (limited warranty or goodwill due to greater mechanical stress), product liability (i.e. improper use). When driving onroad, if the tire diameter is outside the tire diameter specification, the vehicle may display a warning that the rpm-based vehicle speed may be incorrect and that the vehicle is driving with tires not approved for public traffic.

BRIEF DESCRIPTION OF THE FIGURES

An exemplary embodiment of the invention is described in the following on the basis of the appended figures. In the figures.

DETAILED DESCRIPTION

Figure 1:
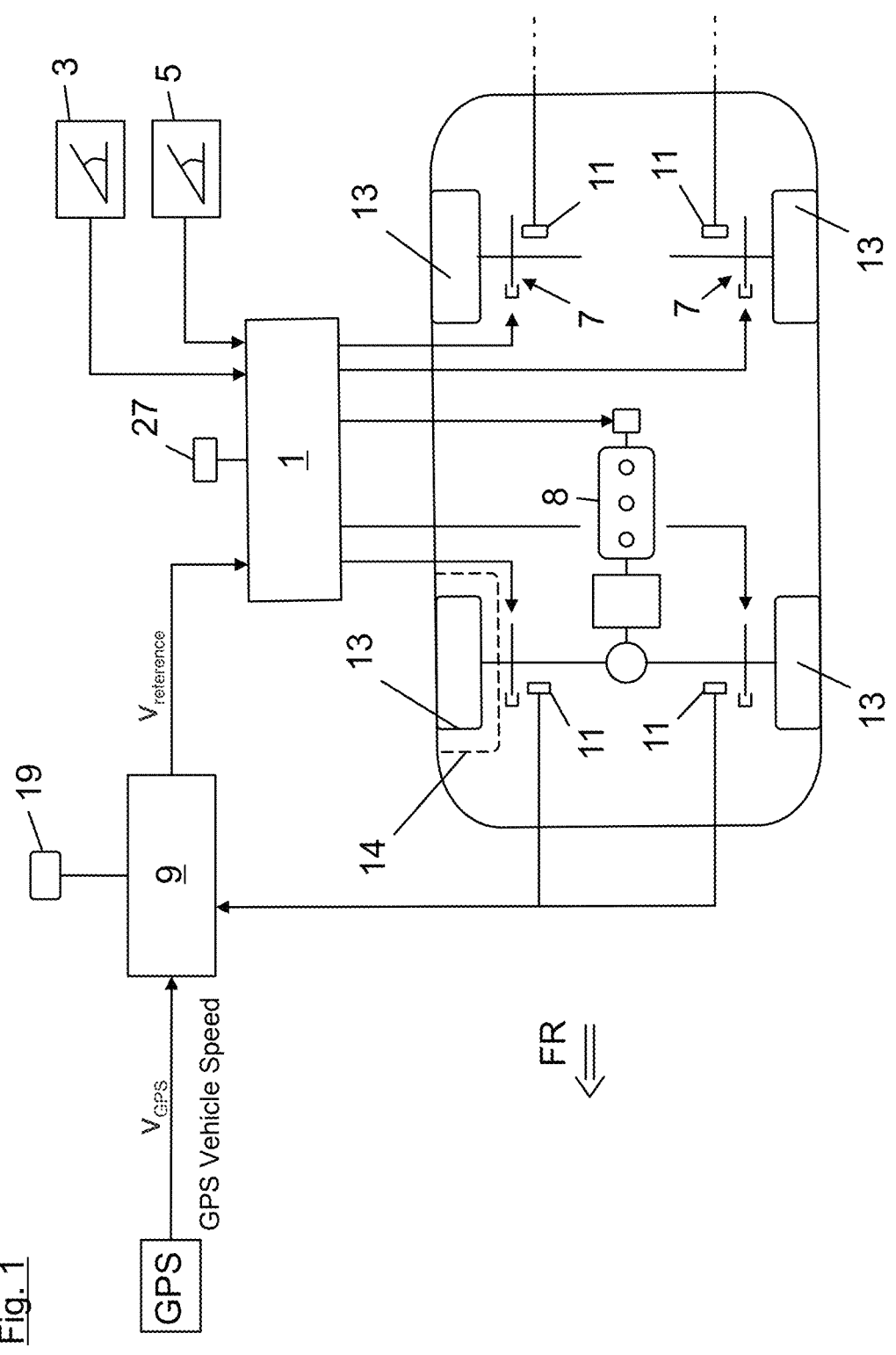
FIG. 1 shows the structure and functioning of a vehicle control system in a block diagram.
Figure 2:
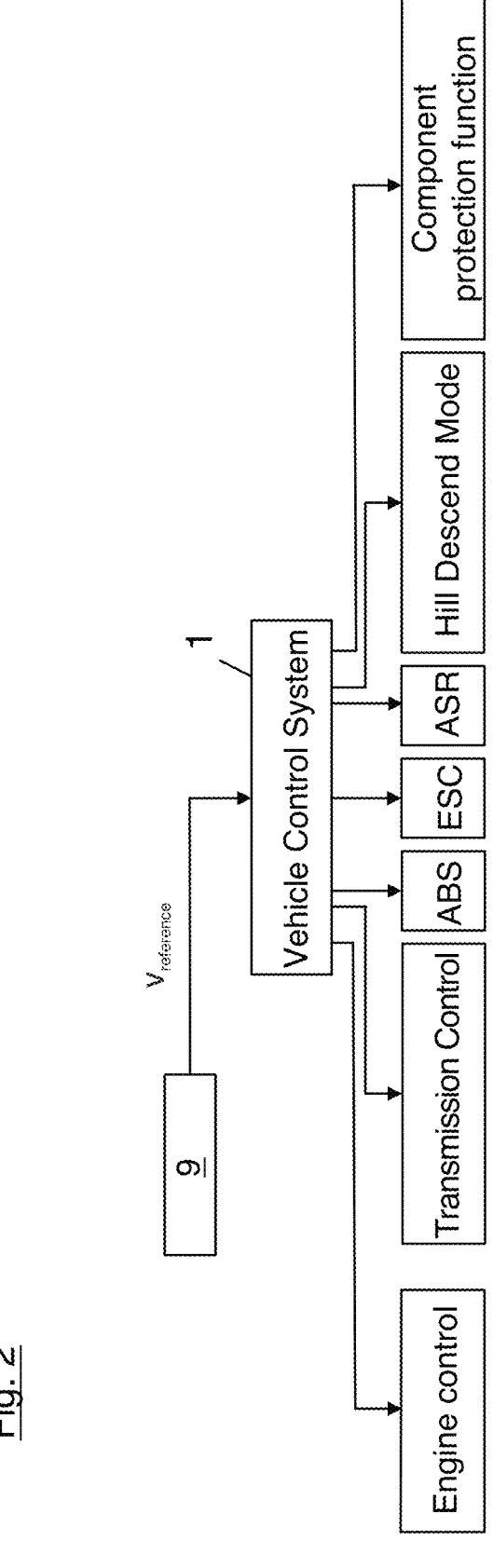
FIG. 2 shows the structure and functioning of a vehicle control system in a block diagram.
Figure 3:
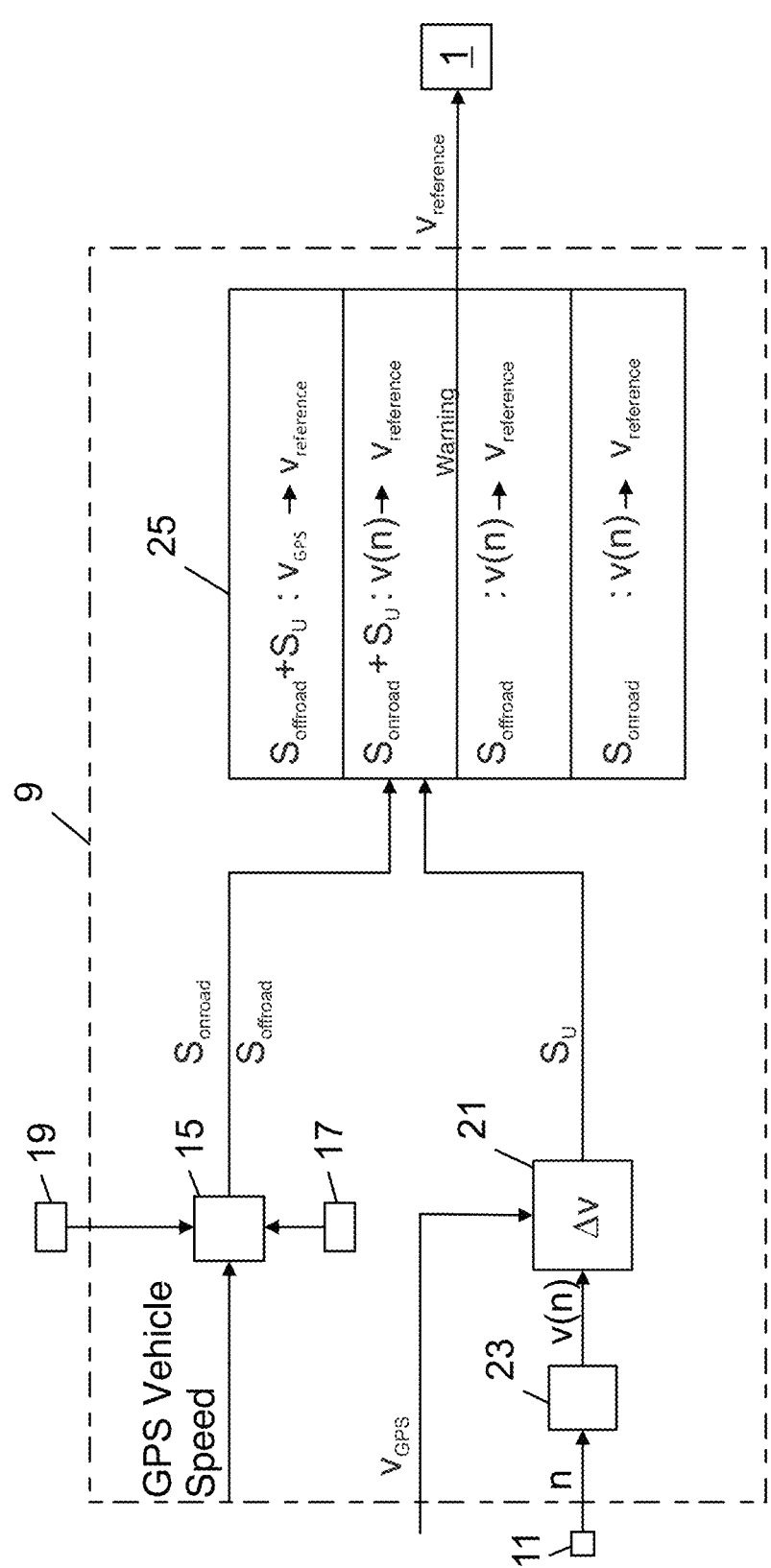
FIG. 3 shows the structure and functioning of a vehicle control system in a block diagram.

In FIG. 1, the structure and the functioning of a vehicle control system 1 of a motor vehicle are indicated to the extent that it is necessary for understanding the invention. FIGS. 1 to 3 each show block diagrams the program modules of which do not reflect the actual software architecture of the vehicle control system 1 installed in the vehicle.

Thus, in FIG. 1, the vehicle control system 1 is in signal connection on the input side with an accelerator pedal 3 and a brake pedal 5. On the basis of the target specifications generated by the accelerator pedal 3 and/or the brake pedal 5, the vehicle control system 1 controls the wheel brakes 7 of a vehicle braking system and a drive unit 8 of the vehicle. An evaluation unit 9 is assigned to the vehicle control system 1. The evaluation unit 9 is in signal connection with wheel speed sensors 11, which are installed on both the front axle and the rear axle of the vehicle and detect the current wheel speed n. Based on the wheel speed n and the tire diameter $d_R$ of the standard tires 13 stored in the vehicle control system 1, the evaluation unit 9 determines a speed-based vehicle speed v(n) according to FIG. 3. In normal operation or onroad driving, the rpm-based vehicle speed v(n) forms a reference variable $v_{reference}$, which is transmitted to the vehicle control system 1 in the block diagrams of FIG. 1 or 3. On the basis of the reference variable $v_{reference}$, the vehicle control system 1 calculates manipulated variables with which different vehicle functions can be controlled. According to FIG. 2, such vehicle functions are an engine control, a transmission control, ABS, ESC, ASR, HillDescendControl and a component protection function, such as a drive/output shaft protection function.

The invention is based on the fact that the vehicle user, when using the motor vehicle on extreme offroad routes, changes the standard tires 13 to offroad tires 14, which are indicated by dashed lines on the front right vehicle wheel in FIG. 1. The onroad tires 14 have a significantly larger tire diameter (namely an onroad tire diameter $d_{onroad}$) compared to the series tires 13, which results in a large tire diameter difference compared to the series tires 13. With such a large difference in tire diameter, the rpm-based vehicle speed v(n) determined based on the tire diameter $d_R$ (stored in the vehicle control system 1) of the standard tires 13 and based on the current wheel speed n deviates from the actual vehicle speed. Accordingly, the problem in the prior art is that the rpm-based vehicle speed v(n), which forms the reference variable, may not ensure optimal control of the vehicle functions.

Against this background, according to the invention, the evaluation unit 9 sets the GPS-based vehicle speed $v_{GPS}$ as the reference variable $v_{reference}$ instead of the rpm-based vehicle speed v(n), provided that both offroad driving and a tire change signal $S_U$ are present, which is generated when there is a significant tire diameter deviation between the offroad tires 14 and the standard tires 13.

The evaluation unit 9 operates with the program modules indicated in FIG. 3: Accordingly, a first determination module 15 is provided which compares a current GPS vehicle position with a road map data set 17 stored in the vehicle control system 1. On the basis of this comparison, the determination module 15 generates an offroad signal $S_{offroad}$ or an onroad signal $S_{onroad}$. Alternatively and/or additionally, a user-operable offroad button 19 of a DriveSelect mode can be assigned to the first determination module 15. When the offroad button 19 is pressed, the vehicle control system 1 switches the vehicle functions to offroad driving mode. In addition, the first determination module 15 generates the offroad signal $S_{offroad}$ when the offroad button 19 is actuated, while the onroad signal $S_{onroad}$ is generated when the offroad button 19 is not actuated.

The evaluation unit 9 also has a second determination module 21. This generates the tire change signal $S_U$ if there is a significant speed difference $\Delta v$ between the rpm-based vehicle speed v(n) and the GPS-based vehicle speed $v_{GPS}$. The second determination module 21 is preceded by a calculation module 23 which calculates the rpm-based vehicle speed v(n) on the basis of the current wheel speed n and on the basis of the tire diameter $d_R$ of the standard tires 13 stored in the vehicle control system 1.

The two determination modules 15, 21 are in signal connection with a provision module 25, in which the following case distinction is made: If both an offroad signal $S_{offroad}$ and a tire change signal $S_U$ are present at the signal input of the provision module 25, the GPS-based vehicle speed $v_{GPS}$ is set as the reference variable $v_{reference}$ in the provision module 25. If an onroad signal $S_{onroad}$ and a tire change signal $S_U$ are present at the signal input of the provision module 25, the rpm-based vehicle speed v(n) is defined as the reference variable $v_{reference}$. In addition, the vehicle user is informed via a display device 27 (FIG. 1) of a warning that the onroad vehicle tires do not comply with the approved specification.

If only an onroad signal $S_{onroad}$ is present at the signal input, but no tire change signal $S_U$, the rpm-based vehicle speed v(n) is defined as the reference variable $v_{reference}$. The same applies if only an offroad signal $S_{offroad}$ but no tire change signal $S_U$ is present at the provision module 25.

LIST OF REFERENCE NUMERALS

1 vehicle control system
3 accelerator pedal
5 brake pedal
7 wheel brakes
8 drive unit
9 evaluation unit
11 wheel speed sensors
13 standard tires
14 offroad tires
15 first determination module
17 road map data-set
19 offroad button
21 second determination module
23 calculation module
25 provision module
37 display means
$v_{reference}$ reference variable
v(n) rpm-based vehicle speed
$v_{GPS}$ GPS-based vehicle speed
n current wheel speed
$S_{offroad}$ offroad signal
$S_{onroad}$ onroad signal
$S_U$ tire change signal
$d_R$ tire diameter of the standard tires 13
$d_{offroad}$ tire diameter of the offroad tires
$\Delta v$ speed difference
FR direction of travel

The invention claimed is:

1. A vehicle control system configured to control different vehicle functions, wherein:
the different vehicle functions comprise a driving dynamics function and/or a component protection function, can be controlled, in which vehicle control system
in the case of on-road driving, an rpm-based vehicle speed determined by a wheel speed sensor forms a reference variable,
the vehicle control system is further configured, based upon the reference variable, to determine driving parameters and/or control the vehicle function,
assigned an evaluation unit which, in the presence of both off-road driving operation and a tire change signal, generated after a significant tire diameter deviation between off-road tires and standard tires, is configured to set a GPS-based vehicle speed as the reference variable, on the basis of which the vehicle control system is configured to determine an off-road tire diameter.

2. The vehicle control system according to claim 1, wherein the vehicle control system is further configured to determine the off-road tire diameter using the following formula, when both off-road offroad driving and the tire change signal are present:

$$d_{offroad} = \frac{v_{GPS} \cdot 1000}{\pi \cdot n}.$$

6

3. The vehicle control system according to claim 2, wherein the evaluation unit has a determination module which is configured to generate the tire change signal when there is a significant deviation of the rpm-based vehicle speed from the GPS-based vehicle speed.

4. The vehicle control system according to claim 2, wherein the vehicle control system has a DriveSelect mode with an off-road button that can be operated by the user and,
when operated, the vehicle control system is configured to switch the vehicle functions to off-road driving mode,
the evaluation unit has a determination module which is configured to recognize an off-road driving mode when the off-road button is operated
configured to generate an off-road signal, and
configured to generate an on-road signal when the off-road button is not operated.

5. The vehicle control system according to claim 1, wherein the evaluation unit has a determination module which is configured to generate the tire change signal when there is a significant deviation of the rpm-based vehicle speed from the GPS-based vehicle speed.

6. The vehicle control system according to claim 5, wherein the determination module has a timer by which the determination module is only configured to generate the tire change signal when the speed difference is present over a predefined time interval.

7. The vehicle control system according to claim 6, wherein the vehicle control system has a DriveSelect mode with an off-road button that can be operated by the user and,
when operated, the vehicle control system is configured to switch the vehicle functions to off-road driving mode,
the evaluation unit has a determination module which is configured to recognize the off-road driving mode when the off-road button is operated,
configured to generate an off-road signal, and
configured to generate an on-road signal when the off-road button is not operated.

8. The vehicle control system according to claim 5, wherein the vehicle control system has a DriveSelect mode with an off-road button that can be operated by the user and,
when operated, the vehicle control system is configured to switch the vehicle functions to off-road driving mode,
the evaluation unit has a determination module which is configured to recognize the off-road driving mode when the off-road button is operated,
configured to generate an off-road signal, and
configured to generate an on-road signal when the off-road button is not operated.

9. The vehicle control system according to claim 1, wherein the vehicle control system has a DriveSelect mode with an off-road button that can be operated by the user and,
when operated, the vehicle control system switches the vehicle functions to driving mode, and
the evaluation unit has a determination module which is configured to recognize the off-road driving mode when the off-road button is operated and generates an off-road signal, and generate an on-road signal when the off-road button is not operated.

10. The vehicle control system according to claim 9, wherein,
the determination module is configured to compare a current GPS vehicle position with a road map data set stored in the vehicle control system, and
the determination module is configured to generate an off-road signal or an on-road signal on the basis of the comparison or configured to recognize off-road driving or on-road driving operation.

11. The vehicle control system according to claim 10, wherein the evaluation unit has a provision module which,
    when both the off-road signal and the tire change signal are present, is
    configured to set the GPS-based vehicle speed as the reference variable,
    configured to maintain the rpm-based vehicle speed as the reference variable when both the on-road signal and the tire change signal are present, and
    configured to generate a warning that the vehicle tires do not correspond to the approved specification.

12. The vehicle control system according to claim 9, wherein the evaluation unit has a provision module which,
    when both the off-road signal and the tire change signal are present, is
    configured to set GPS-based vehicle speed as the reference variable,
    configured to maintain the rpm-based vehicle speed as the reference variable when both the on-road signal and the tire change signal are present, and
    configured to generate a warning that the vehicle tires do not correspond to the approved specification.

13. The vehicle control system according to claim 12, wherein the evaluation unit is configured to inform the vehicle user of a liability exclusion and/or a warranty limitation when the tire change signal is present, and
    the vehicle user must acknowledge the liability exclusion and/or the warranty limitation in order to be able to continue driving.

\* \* \* \* \*